INVENTORS
RICHARD VALENTINE MOORE
STANLEY HACKNEY
BY Larson and Taylor

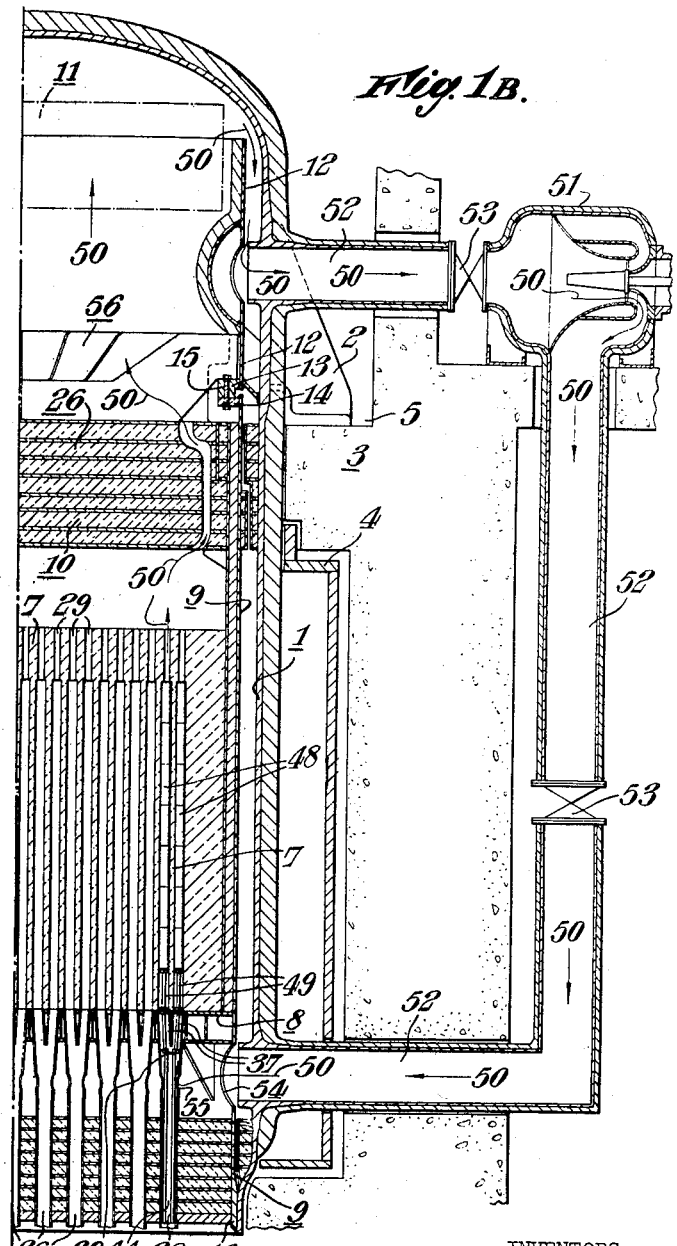

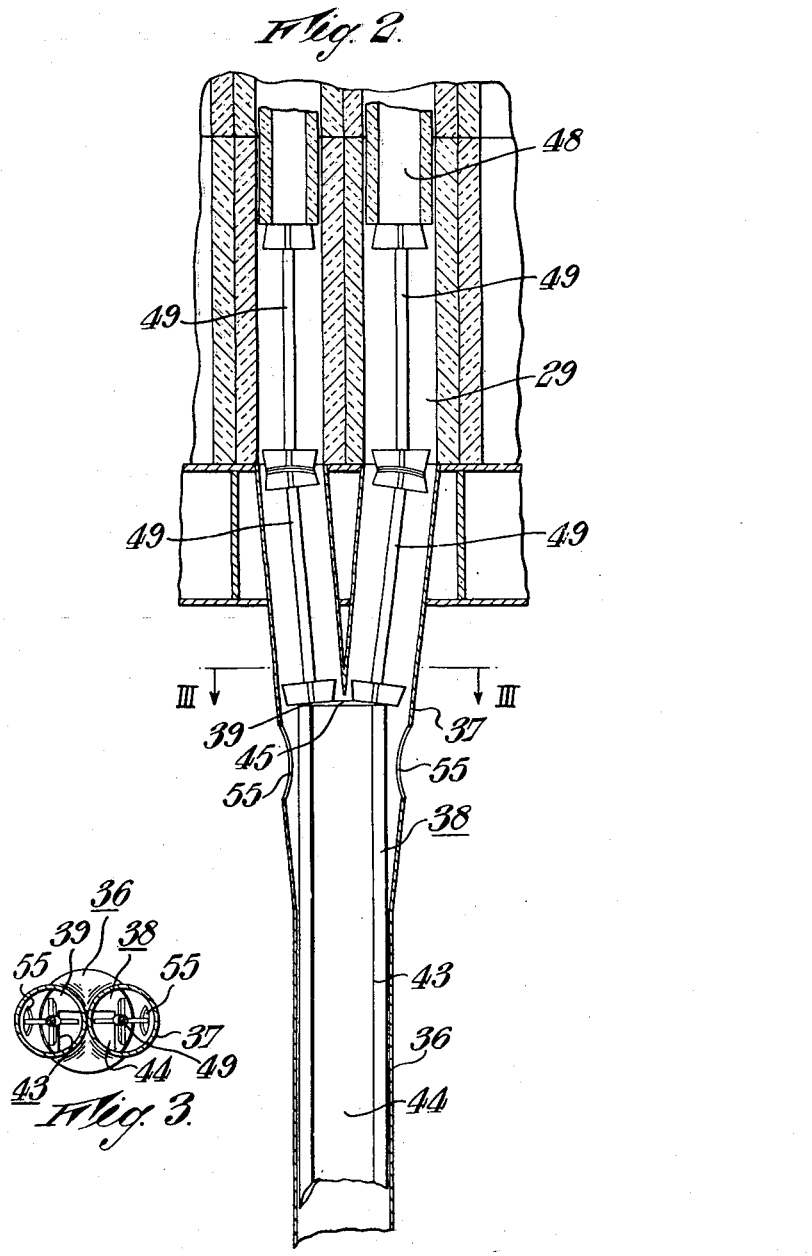

INVENTORS
RICHARD VALENTINE MOORE
STANLEY HACKNEY

United States Patent Office 3,159,549
Patented Dec. 1, 1964

3,159,549
NUCLEAR REACTORS
Richard Valentine Moore, Appleton, and Stanley Hackney, Fearnhead, Warrington, England, assignors to United Kingdom Atomic Energy Authority, London, England
Filed Mar. 10, 1959, Ser. No. 798,519
5 Claims. (Cl. 176—58)

This invention relates to nuclear reactors of the kind comprising a graphite moderator core supported within a containment vessel.

A serious failure occurring in the reactor core may involve permanent shut down of the reactor, or at the best shut down of the reactor for many months, firstly to allow decay of radioactive substances until there is a permissible level of radiation such that personnel can obtain access to the reactor core to perform repair work and secondly because work can only proceed at such a rate so that no maintenance worker spends an undue time in the region of the core.

The present invention is based on the concept of constructing a graphite moderated reactor so that the core can be made removable as a whole from its containment vessel and replaced by a new core.

Accordingly the invention resides in a nuclear reactor of the kind described wherein the graphite moderator core has an end radiation shield in the containment vessel, the core and shield being supported in a structure allowing removal of the core and shield en bloc through an opened end of the containment vessel with the radiation protection afforded by the end radiation shield.

Figure 1A:
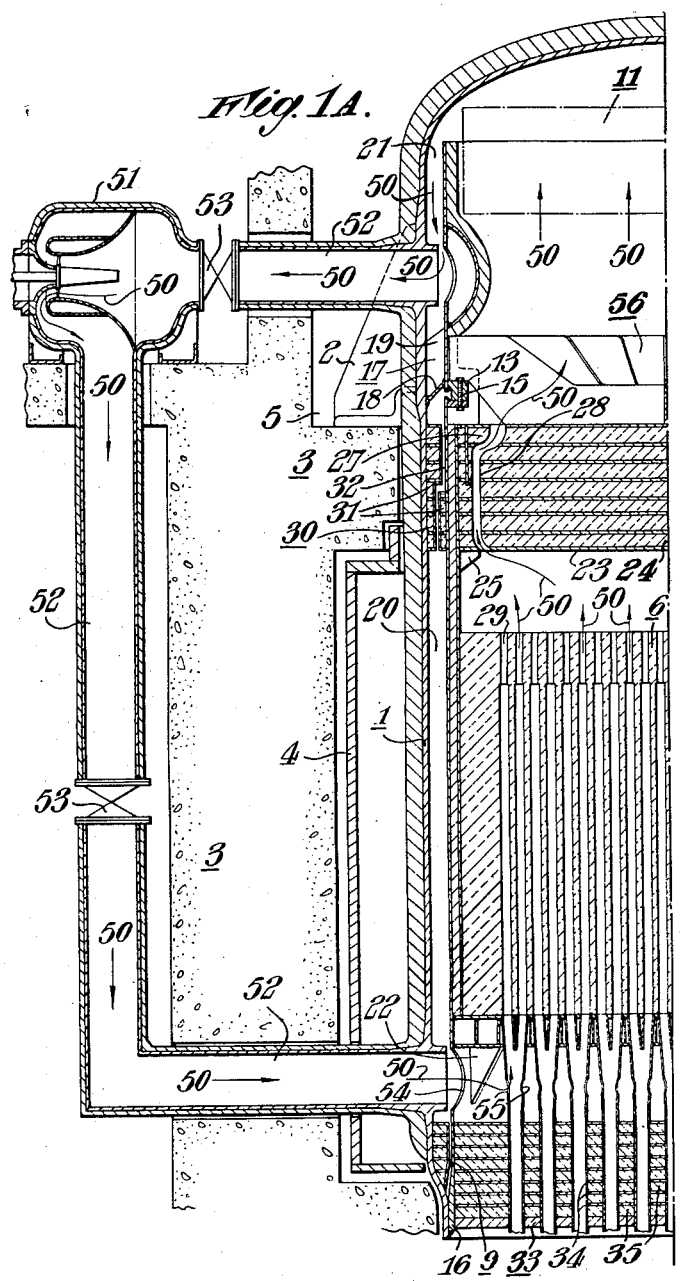
Figure 4:
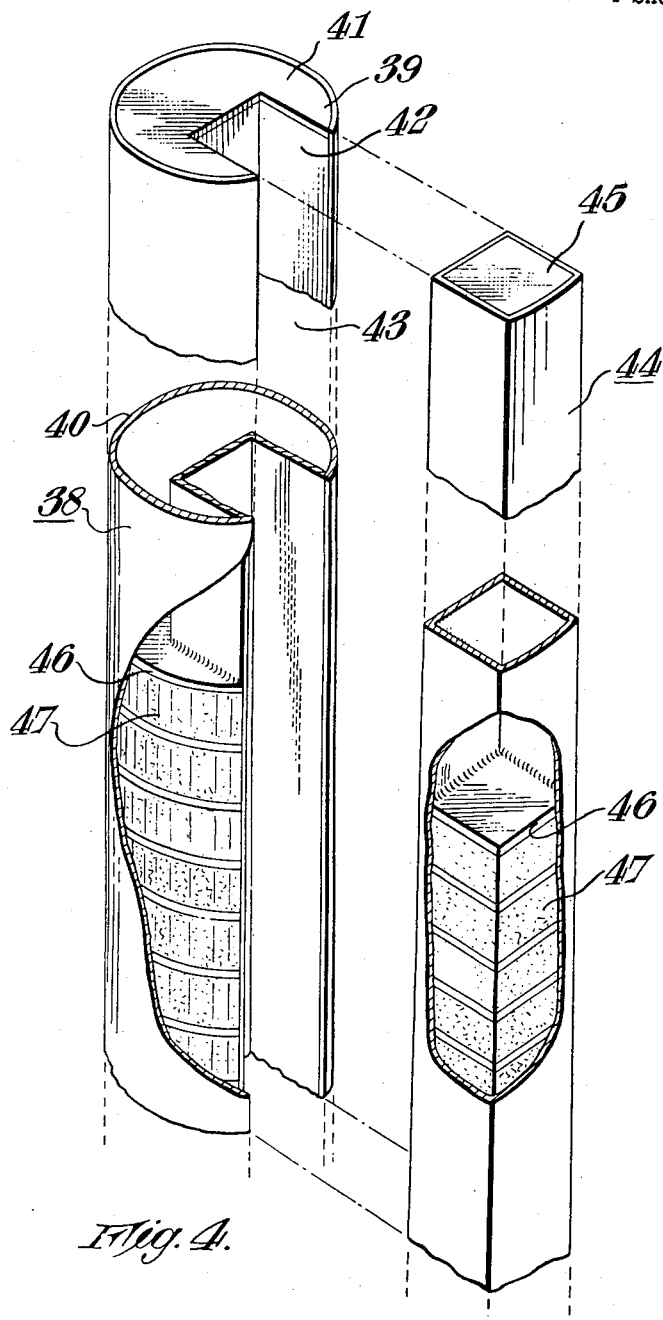

One embodiment of the invention will now be described by way of example with reference to the accompanying drawings in which:

FIGS. 1A and 1B are longitudinal sectional elevations
FIG. 2 is a detail of FIGS. 1A and 1B on a larger scale
FIG. 3 is a section along the line III—III in FIG. 2
FIG. 4 is a detail of FIG. 1B in isometric form In FIGS. 1A and 1B there is shown a graphite moderated gas cooled nuclear reactor comprising a pressure vessel 1 supported by angle brackets 2 within a concrete biological radiation shield 3 lined with a thermal neutron shield 4 of mild steel.

The brackets 2 are welded to the pressure vessel 1 and rest on a horizontal ledge 5 in the radiation shield 3. The pressure vessel 1 contains a graphite moderator structure 6 comprising an assembly of graphite blocks 7 stacked on a bottom support grid 8 within a cylindrical mild steel casing 9. The casing 9 also contains a composite radiation shield 10 intermediately located between the moderator structure 6 and a heat exchanger assembly 11 (shown in chain dotted outline). The heat exchanger assembly 11 may be for example as disclosed on copending application Serial No. 745,955, filed July 1, 1958, now Patent No. 3,105,805, granted October 1, 1963, and is contained within a cylindrical extension 12 of the casing 9 having an internally welded end flange 13 at which connection is made with the casing 9 through an internal end flange 14 therein by means of bolts 15. The casing 9 is flangibly sealed at its lower end 16 to the pressure vessel 1 by a seam weld and the extension 12 of the casing 9 is concentrically located within the pressure vessel 1 by a compositely welded fabrication 17 comprising a ring member 18 stiffened by webs 19. The casing 9 and the extension 12 thereof are of smaller external diameter than the internal diameter of the pressure vessel 1 to provide below the ring member 18 a thermally insulating annular gas space 20 between the casing 9 and the pressure vessel 1 and above the ring member 18 an annular space 21 between the extension 12 of the casing 9 and the pressure vessel 1 for the passage of coolant gas after the gas has traversed the heat exchanger assembly 11. The grid 8 supporting the moderator structure 6 is carried by angle brackets 22 welded inside the casing 9. The composite radiation shield 10 which comprises alternate layers of mild steel plates 23 and graphite blocks 24 has a central part 26 of circular cross-section suspended from a grid of beams 56 which are welded to the extension 12 of the casing 9 and rest on the flange 13. The part 26 of the shield 10 is surrounded by an outer part 27 of annular cross section supported in the casing 9 by brackets 25. Part annular curved passageways 28 defined between the parts 26 and 27 of the shield 10 provide for the passage of coolant gas in circuit between fuel element channels 29 in the moderator structure 6 and the heat exchanger assembly 11. An extension 30 of the shield 10 is located in the thermally insulating gas space 20 between the pressure vessel 1 and the casing 9 and comprises parts 31 shaped to provide a staggered annular passageway 32 preserving the continuity of the gas space 20.

The lower end 16 of the casing 9 is closed by a laminated structure 33 serving two functions. Firstly, the structure 33 acts as a radiation shield by virtue of being constructed from alternate layers of mild steel plates 34 and graphite blocks 35. Secondly, as the structure 33 is sealed inside the casing 9 it acts to withstand the pressure of coolant gas within the pressure vessel 1 and the casing 9.

The structure 33 is pierced by a lattice of Y-branched refuelling tubes 36 each branded into two arms 37 connecting with fuel element channels 29 in the moderator structure 6.

Referring to FIGS. 2, 3 and 4 the refuelling tubes 36 each contain a rotatable cylindrical plug 38 terminating in a conical face 39 at the point of branching of the corresponding refuelling tube 36. As shown in FIG. 4 each plug 38 comprises a tubular body 40 closed by end plates 41 and fitted with a channel member 42 forming a longitudinal passageway 43 through the refuelling tube 36. The passageways 43 are normally blocked by hollow push rods 44 having upper end faces 45 complementing the conical end faces 39 of the plugs 38. The plugs 38 and the push rods 44 are partially filled with alternate layers of mild steel 46 and graphite 47 preserving the continuity of the structure 33 which is pierced by the refuelling tubes 36. A string of fuel elements 48 is supported in each of the fuel element channels 29 by spider ended struts 49 acting between the bottom fuel element 48 of each string and the conical end face 39 of the corresponding rotatable plug 38.

Coolant gas is circulated (as indicated in FIGS. 1A and 1B by the arrows 50), in a closed circuit including the fuel element channels 29 and the heat exchanger assembly 11. The coolant gas is circulated by means of coolant circulating pumps 51 located in manifold pipes 52 connecting with the pressure vessel 1 above and below the ring member 18. The manifold pipes 52 also include shut off valves 53. Heated coolant passes from the fuel element channels 29 through the curved passageways 28 in the radiation shield 10 and thence through the heat exchanger assembly 11. From the heat exchanger assembly 11 the coolant passes down the annular space 21 above the ring member 17 and through the coolant circulating pumps 51 via the manifold pipes 52. The coolant gas is then passed into the casing 9 below the moderator structure 6 through ports 54 in the casing 9 and thence through ports 55 in the refuelling tubes 36 (see FIG. 2) into the fuel element channels 29 thus completing the circuit. During normal operation of the reactor the rotatable plug 38 in each of the refuelling tubes 36 is located as shown in FIG. 3 with the passageway 43 blocked by the corresponding push rod 44.

To discharge a particular fuel element channel 29 the rotatable plug 38 of the refuelling tube 36 associated with that channel 29 is rotated so that the passageway 43 is positioned in connection with the branch arm 37 leading into the fuel element channel 29 required to be discharged. The push rod 44 is then removed to unblock the passageway 43 so that the string of fuel elements 48 can be discharged en bloc through the passageway 43 with the struts 49. The fuel element channel 29 is recharged by alternately inserting new fuel elements 48 into the passageway 43 while the rotatable plug 38 is position as shown in FIG. 3 and raising the fuel elements up into the fuel element channel 29 by means of the push rod 44 after rotating the plug 38 so that the pasageway 43 connects with the fuel element channel 29 to be recharged through the corresponding branch arm 37 of the refuelling tube 36. While each fuel element is inserted in the passageway 43 the fuel elements already inserted are retained by the conical end face 39 of the rotatable plug 38. After charging of the full string of fuel elements the spider ended struts 49 are inserted in a similar manner to the fuel elements so that the recharged string of fuel elements is supported in the fuel element channel 29 as shown in FIG. 1B.

The structure 33 which acts as a radiation shield to protect personnel working beneath the reactor also shields the seam weld between the casing 9 and the pressure vessel 1 so that this seam weld is accessible for breaking down when it is necesary to remove the casing 9 with the moderator structure 6 and the heat exchanger assembly 11 en bloc from the pressure vessel 1 in the event of a major structural failure during the working life of the reactor. Removal of the casing 9 is conveniently effected by bringing up a transporting vehicle beneath the structure 33, engaging the structure 33 with lifting jacks, breaking the frangible seam weld means at 16, obtaining manual access through a pipe 52 to the interior of the pressure vessel and casing 9, unscrewing the bolts 15, and lowering the casing 9 complete with moderator 6 and heat exchanger 11 by means of the screw jacks on to the transporting vehicle for conveyance to a mortuary facility in which it is sealed. The shield 10 protects personnel who obtain access to the pressure vessel for unscrewing the bolts 15. The removed casing 9 may be replaced by reversing the above procedure with a fresh casing 9 containing a new moderator 6, radiation shields 10 and 33, and either a new heat exchanger 11 or the one removed from the reactor if undamaged.

We claim:
1. In a nuclear reactor, the combination comprising:
 (A) a reactor containment vessel having an access opening normally closed for recirculation of a pressurized fluid in the vessel;
 (B) a reactor core unit of solid form disposed within the vessel during operation of the reactor and removable as a whole and in one piece through the access opening of the vessel, said reactor core including
  (1) a pair of solid radiation shielding means disposed opposite one another in a spaced relationship along an extended axis of the access opening, said shielding means being disposed transverse to said axis,
  (2) a reactive core disposed in the space between the shielding means, and
  (3) means joining the core with the shielding means to form the unit;
 (C) and means frangibly securing the unit to the vessel on the side of one of the shielding means remote from the core, the said one shielding means providing protection during removal of the unit from the vessel.

2. The combination according to claim 1 wherein the unit is disposed adjacent the opening and is sealed to the vessel at the periphery of the opening by the frangible securing means so as to close the opening for recirculation of the pressurized fluid in the vessel.

3. The combination according to claim 2 wherein the means joining the core with the shielding means includes a tubular casing having the pair of shielding means mounted on the end portions thereof, said core being disposed between said shielding means and supported by a grid structure attached to the interior of the casing, one end portion of the casing being disposed adjacent the opening and sealed to the vessel at the periphery of the opening by said frangible securing means.

4. The combination according to claim 3 wherein the vessel has said opening in the base portion thereof and the casing is suspended over the opening in upright position, the lower end portion of the casing and the base portion of the vessel being frangibly secured together by welding at the periphery of the opening.

5. The combination according to claim 4 wherein the vessel is of upright cylindrical form with its upper end closed and the casing is suspended in the vessel coaxial therewith.

References Cited in the file of this patent
UNITED STATES PATENTS

| | | |
|---|---|---|
| 2,714,577 | Fermi et al. | Aug. 2, 1955 |
| 2,736,696 | Wigner et al. | Feb. 28, 1956 |
| 2,809,931 | Daniels | Oct. 15, 1957 |
| 2,873,242 | Treshow | Feb. 10, 1959 |
| 2,985,575 | Dennnis et al. | May 23, 1961 |

OTHER REFERENCES

AEC Publication, "Research Reactors," TID-5275, Aug. 18, 1955, pages 315–318.